United States Patent
Xu et al.

(10) Patent No.: US 10,797,358 B2
(45) Date of Patent: Oct. 6, 2020

(54) SMART POWER BANK SYSTEM FOR EFFICIENT ENERGY TRANSFER

(71) Applicant: Apple Inc., Cupertino, CA (US)

(72) Inventors: XunGuang Xu, Shenzhen (CN); Jieli Li, Fremont, CA (US); Zifeng Shen, Dublin, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 15/955,206

(22) Filed: Apr. 17, 2018

(65) Prior Publication Data

US 2018/0248397 A1 Aug. 30, 2018

Related U.S. Application Data

(62) Division of application No. 14/694,339, filed on Apr. 23, 2015, now Pat. No. 9,997,940.

(51) Int. Cl.
*H02J 7/00* (2006.01)
*H02J 7/34* (2006.01)
*H01M 10/42* (2006.01)

(52) U.S. Cl.
CPC ......... *H01M 10/4257* (2013.01); *H02J 7/342* (2020.01); *H02J 7/00* (2013.01); *H02J 7/00034* (2020.01); *H02J 7/00036* (2020.01); *H02J 7/00045* (2020.01); *H02J 2007/0067* (2013.01); *H02J 2207/20* (2020.01)

(58) Field of Classification Search
CPC .............................. H02J 7/0065; H02J 7/0054
USPC ................. 320/103, 114, 128, 135
See application file for complete search history.

(56) References Cited

U.S. PATENT DOCUMENTS

| | | |
|---|---|---|
| 7,447,922 B1 | 11/2008 | Asbury |
| 8,450,979 B2 | 5/2013 | Kerr |
| 8,482,256 B2 | 7/2013 | Zhu |
| 2004/0178766 A1 | 9/2004 | Bucur |
| 2006/0187689 A1 | 8/2006 | Hartular |
| 2012/0086276 A1 | 4/2012 | Sawyers |
| 2012/0139345 A1 | 6/2012 | Ye |
| 2012/0319487 A1 | 12/2012 | Shah |
| 2013/0049675 A1* | 2/2013 | Minami ................ H02J 7/0054 320/103 |
| 2013/0154550 A1 | 6/2013 | Balmefrezol |

(Continued)

FOREIGN PATENT DOCUMENTS

| | | |
|---|---|---|
| CN | 104539026 A | 4/2015 |
| WO | 2014203490 A1 | 12/2014 |

*Primary Examiner* — Zixuan Zhou
(74) *Attorney, Agent, or Firm* — Blank Rome LLP (57) ABSTRACT

In general, techniques are disclosed for efficiently transferring power from a portable power bank to an electronic device. More particularly, a disclosed power bank incorporates a switching mechanism capable of routing battery voltage (novel) or a stepped-up voltage (e.g., from a boost regulator) directly to a common portion of an output connector. In addition, electronic devices as described herein also incorporate a switching mechanism to allow them to accept direct battery output (novel) or a stepped-up voltage at a common portion of the device's connector (e.g., a USB connector). When used in combination, the disclosed portable power bank can transfer power to the electronic device with no more than half the loss attributable to voltage conversion operations of the prior art.

9 Claims, 13 Drawing Sheets

(56) References Cited

U.S. PATENT DOCUMENTS

2014/0300310 A1  10/2014  Caren
2015/0033046 A1   1/2015  Su
2015/0091497 A1*  4/2015  Leung .................. H02J 7/0029
                                              320/107

* cited by examiner

SMART POWER BANK SYSTEM FOR EFFICIENT ENERGY TRANSFER

BACKGROUND

This disclosure relates generally to supplying power to electronic devices. More particularly, but not by way of limitation, this disclosure relates to a portable power source for the efficient transfer of power to an electronic device.

Rechargeable Batteries may be found in a variety of portable electronic devices including laptop, notebook and tablet computer systems, personal digital assistants (PDAs), cell phones, digital media players, cameras, etc. Current battery technology provides only a moderate amount of energy storage. As a result, individuals that make heavy use of their portable devices can find the need to recharge them while away from home or office. For this, individuals may use an AC powered charger, a backup or replacement battery, or an external battery pack used to charge the electronic device's internal battery. The latter type of device is often referred to as a "power bank."

Figure 1:
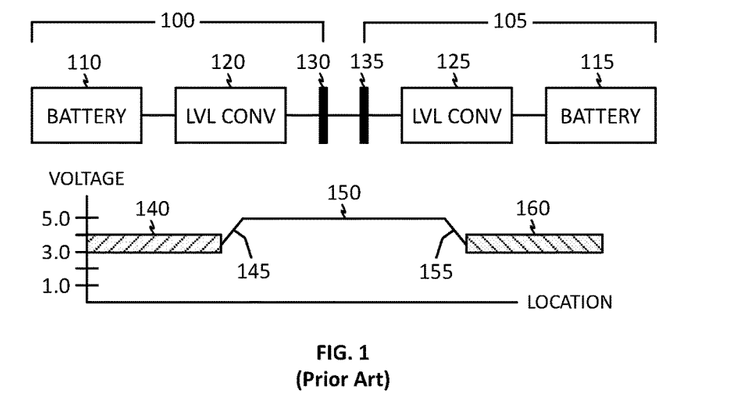
FIG. 1 shows, in block diagram form, a prior art power bank-electronic device system.

Many prior art power banks supply power through a specific type of connector adhering to a standard. For example, many power banks use a Universal Serial Bus (USB) connector. As a consequence, they supply voltage at a level required by the USB standard, nominally 5.0 volts. Similarly, because electronic devices comport to the same standard, they must be able to accept an input voltage at 5.0 volts. Batteries used in modern electronic devices however often have a terminal voltage of between 3.0 volts (fully, or near fully discharged) and 4.2 volts (fully, or near fully charged). Because of these voltage imbalances, prior art power banks will always need to boost their internal battery's output voltage to the USB's standard 5.0 volts, and an electronic device will always need to buck the incoming voltage to meet that of their internal battery (plus, perhaps, a small delta voltage needed to drive charging operations). This situation is shown in FIG. 1 in which power bank 100 and electronic device 105 each include a battery (110 and 115 respectively), a voltage level converter (120 and 125 respectively), and a USB connector (130 and 135 respectively). As shown, power bank 100's internal battery voltage 140 is between, for example, 3.0 and 4.0 volts. Through level converter 120 boost operation 145 takes this to 5.0 volts, transfer voltage 150. Level converter 125 in electronic device 105 uses buck operation 155 to then reduce transfer voltage 150 to its internal battery level 160 and/or a level needed by device 105's internal electronics (between, for example, 3.0 and 4.0 volts).

It is known that the power conversion efficiency of a boost operation is approximately equal to the power conversion efficiency of a buck operation: 83%. While the precise value will of course differ based on, for example, the type of switching elements used, the difference in output versus input voltage and the circuit's mode of operation (e.g., continuous versus discontinuous conduction modes), whatever this value is, contemporary power banks suffer such a loss twice (one loss in power bank 100 and another loss in electronic device 105).

SUMMARY

In one embodiment the disclosed concepts provide a smart battery bank to enable an efficient transfer of power to an electronic device. A smart battery bank in accordance with this disclosure may include a source of power such as a battery, a voltage level converter configured to convert a first (lower) voltage to a second (higher) voltage, a switching mechanism, a connector, and a controller functionally coupled to the switching mechanism and the connector, the controller configured to execute instructions stored in a memory, the instructions adapted to cause the controller to obtain a signal from the connector (i.e., from an external electronic device), configure the switching mechanism to route output from its internal power source to the connector without use of the voltage level converter when the signal indicates that an electronic device of a first type is coupled to the connector. The controller may be further adapted to, when the signal indicates than an electronic device of a second type is coupled to the connector, configure the switching mechanism to route output from the power source to an input of the voltage level converter and the resulting output from the voltage level converter to the connector. A power bank in accordance with this disclosure can deliver power to an electronic device with, at most, half the loss due to voltage level conversion operations as do conventional power banks.

In another embodiment the disclosed concepts provide a smart electronic device that includes a battery, a boost/buck regulator module, a switching mechanism, a connector and a controller functionally coupled to the switching mechanism and the connector, the controller configured to execute instructions stored in a memory adapted to cause the controller to: obtain a first signal indicative of a target operational mode of the electronic device and, when the first signal indicates a first operational mode, configure the switching mechanism to (1) route the externally supplied power from the connector to an input of the boost/buck regulator and the resulting output from the boost/buck regulator to the battery, (2) route output from the battery to power the electronic device, and (3) open an electrical path so that the externally supplied power does not directly power the electronic device. When the first signal indicates a second operational mode, the controller configures the switching mechanism to (1) route the externally supplied power from the connector so as to directly power the electronic device, (2) disconnect the input of the boost/buck regulator from the connector, and (3) disconnect the battery so that it does not power the electronic device. In yet another embodiment, the smart electronic device may further include instructions to cause, when the first signal indicates a third operational mode, the controller to configure the switching mechanism to (1) route the externally supplied power from the connector so as to directly power the electronic device, (2) route the externally supplied power from the connector to the boost/buck regulator's input and the resulting output from the boost/buck regulator to the battery, and (3) disconnect the battery so that it no longer powers the smart electronic device.

DETAILED DESCRIPTION

This disclosure pertains to systems, methods, and computer readable media to improve the transfer of power between a portable power bank and an electronic device. In general, techniques are disclosed for efficiently transferring power from a portable power bank to an electronic device. More particularly, a disclosed power bank incorporates a switching mechanism capable of routing battery voltage (novel) or a stepped-up voltage (e.g., from a boost regulator) directly to a common portion of an output connector. In addition, electronic devices as described herein also incorporate a switching mechanism to allow them to accept direct battery input (novel) such as that from the disclosed power bank or a stepped-up voltage at a common portion of the device's connector (e.g., a USB connector). When used in combination, the disclosed portable power bank can transfer power to the electronic device with no more than half the loss attributable to voltage conversion operations of prior art power banks.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of electronic system power circuitry having the benefit of this disclosure.

Figure 2:
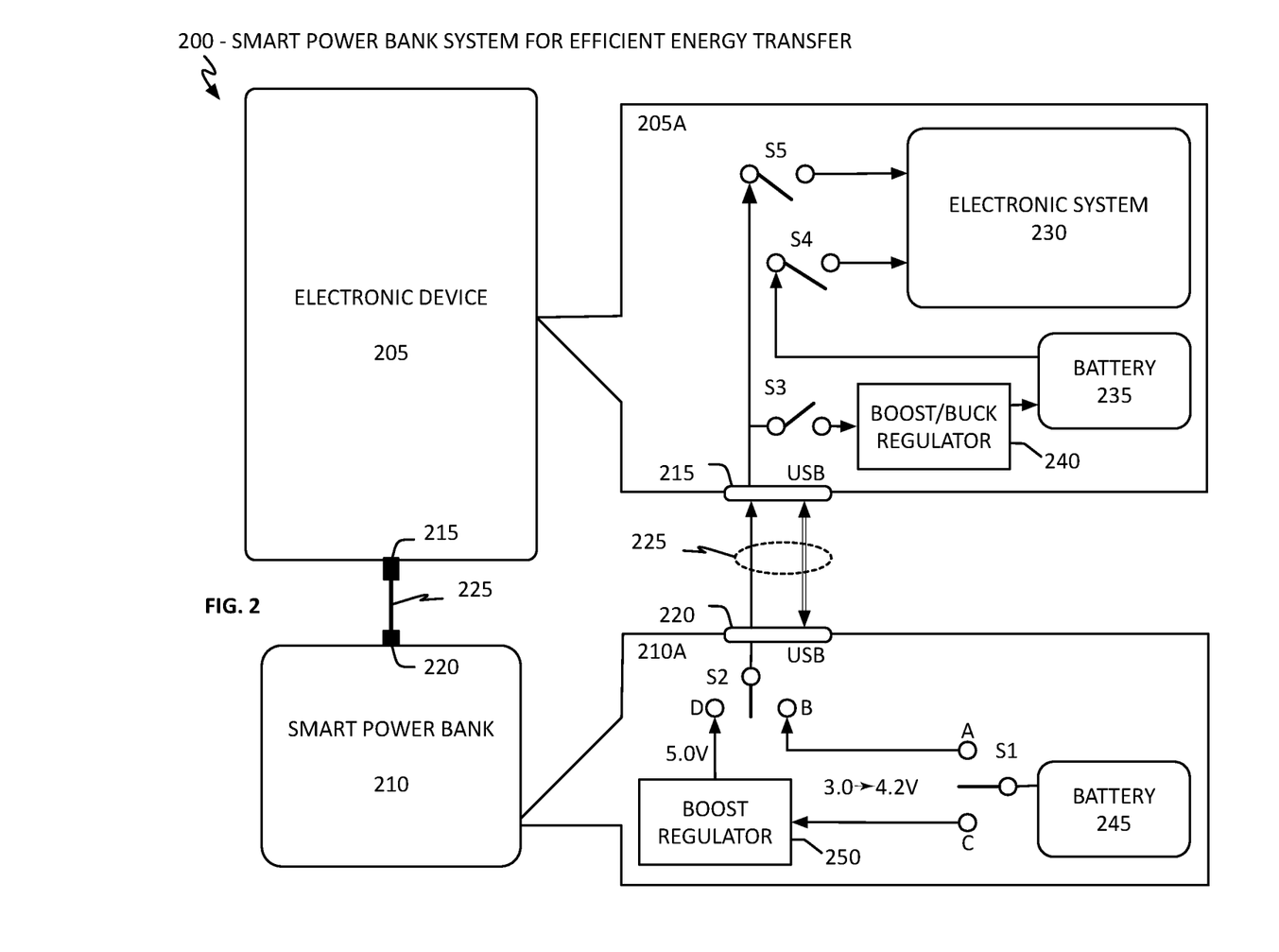
FIG. 2 shows, in block diagram form, a smart power bank system in accordance with one embodiment.

Referring to FIG. 2, smart power bank system 200 in accordance with one embodiment includes smart electronic device 205 and smart power bank 210 joined through connectors 215 and 220 via cable 225. Smart electronic device 205 may, for example, be a cell phone, PDA, digital media player or tablet computer system. Connectors 215 and 220 may be any similar connectors whose structure and function are known (e.g., as specified in an electrical standard such as the USB standard). As shown in breakout 205A, smart electronic device 205 may include electronic system 230, battery 235, boost/buck regulator 240, and switches S3, S4 and S5. Component 230 represents the electronic and other elements that provide the means for electronic device 205 to perform its intended functions (i.e., to function as a cell phone or a tablet computer system). As shown in breakout 210A, smart power bank 210 includes battery 245, boost regulator 250 and switches S1 and S2.

In accordance with this disclosure, smart power bank system 200 may operate in one of two primary modes: boost and bypass. Boost mode replicates conventional power bank operation in so far as smart power bank 210 supplies power at a voltage corresponding to the connector's standard and smart electronic device 205 establishes a corresponding internal routing mechanism consistent with receiving the specified voltage. In bypass mode, smart power bank 210 supplies its battery voltage directly to its connector and smart electronic device 205 establishes corresponding internal routing mechanisms to use that power in a manner more efficient than conventional power bank systems.

Figure 3:
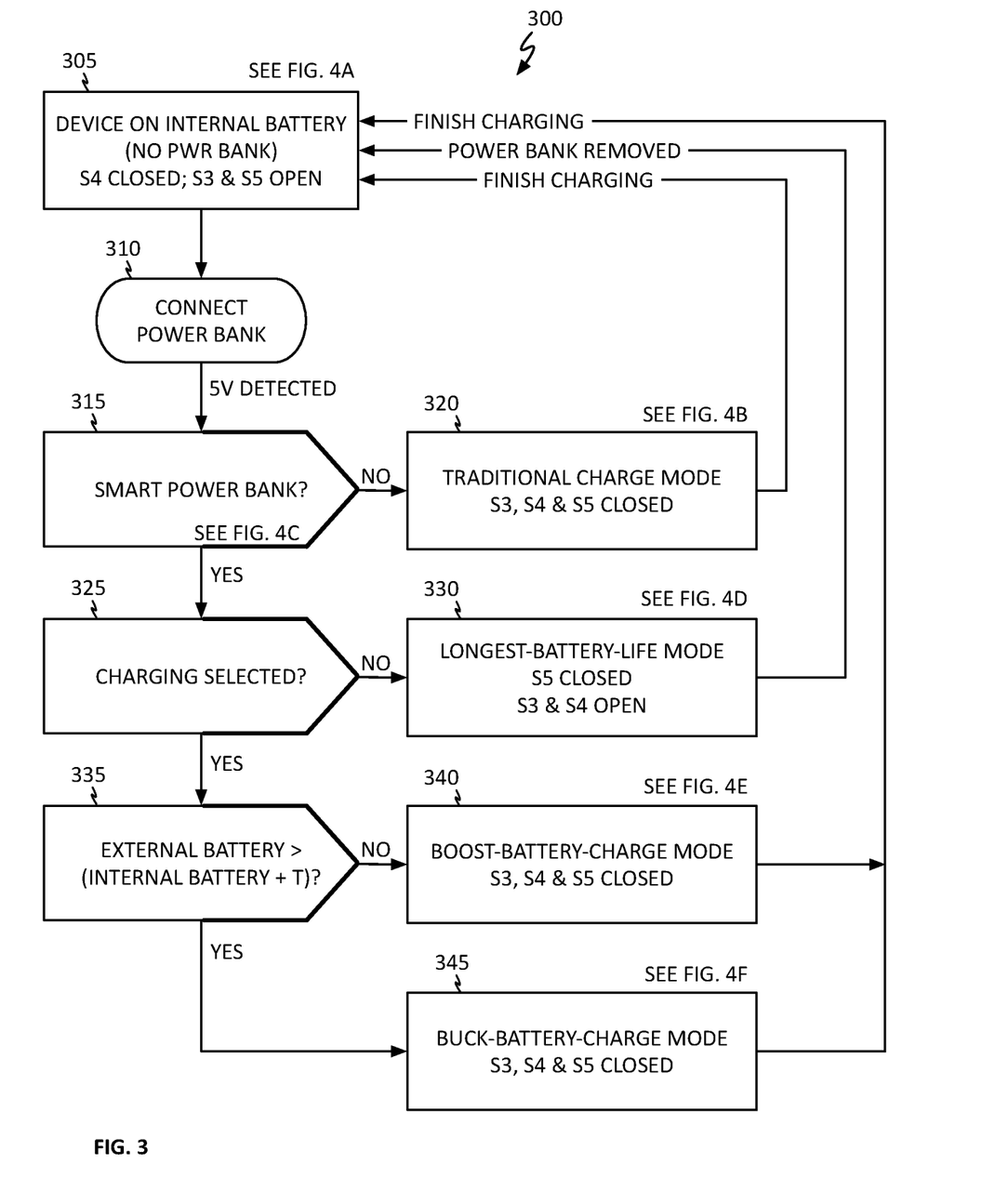
FIG. 3 shows, in flowchart form, smart device centric power transfer operations in accordance with various embodiments.
Figure 4A:
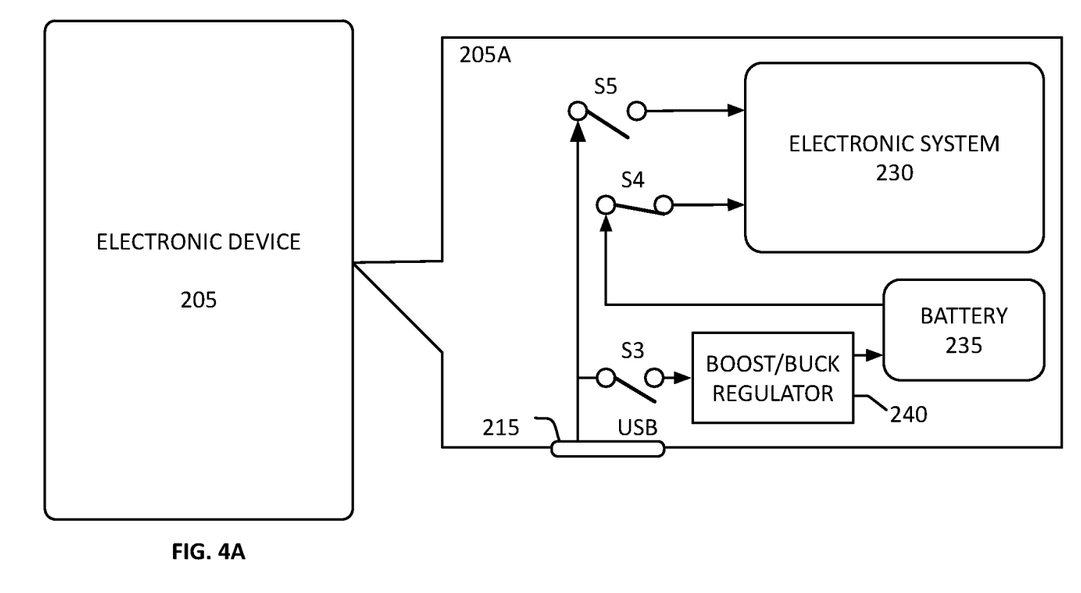
FIGS. 4A-4F show, in block diagram form, smart power bank systems configured in different manners in accordance with this disclosure.
Figure 4B:
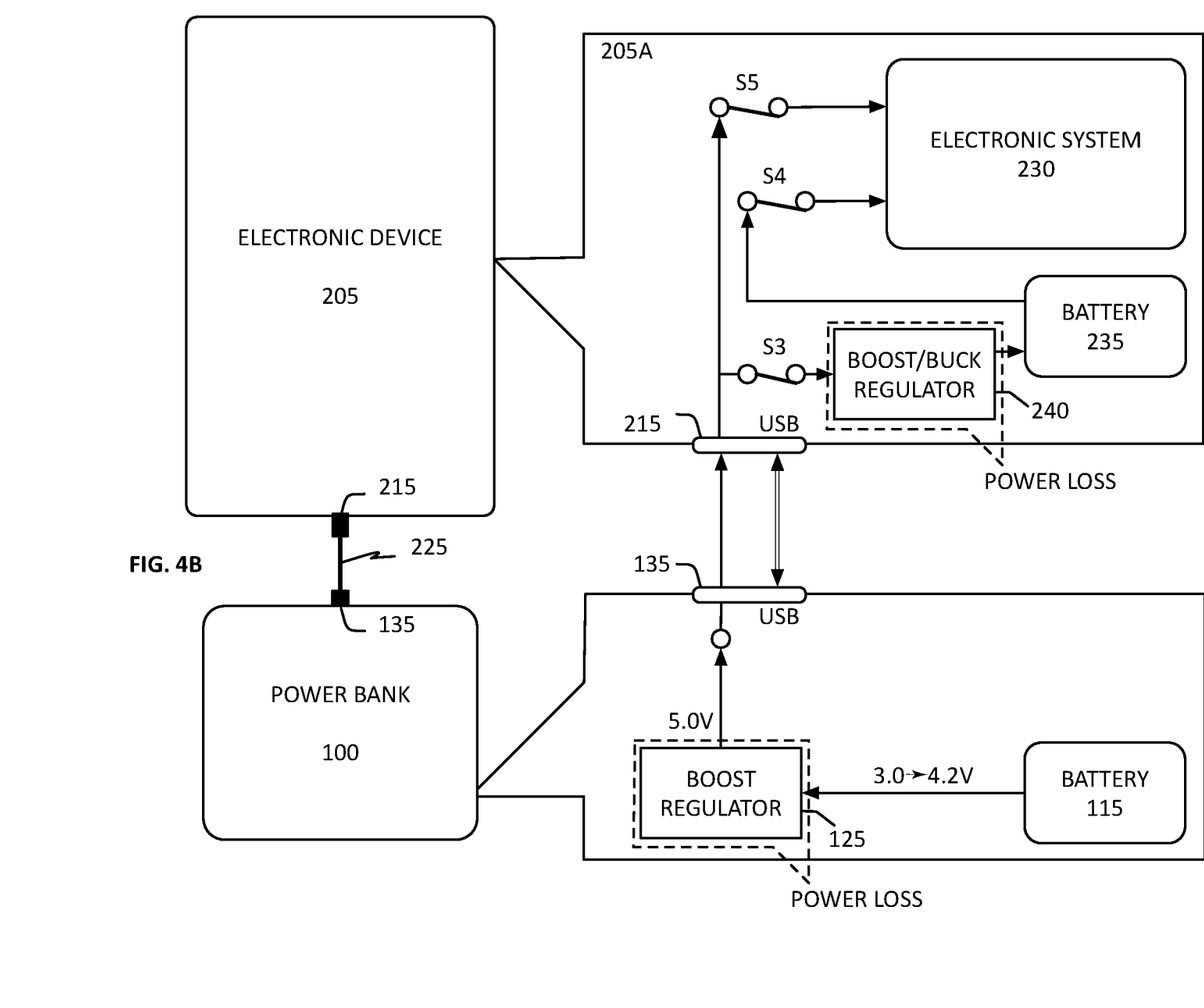

Referring to FIG. 3, in one embodiment power transfer operation 300 from an electronic device's perspective may begin, prior to any power bank being connected thereto, with smart electronic device 205 executing on its own internal battery power with switch S4 closed and switches S3 and S5 open as shown in FIG. 4A (block 305). When smart device 205 is connected to a power bank (block 310), smart device 205 may determine if it is coupled to a smart power bank (block 315). If smart device 205 determines the connected power bank is not a smart power bank in accordance with this disclosure (the "NO" prong of block 315), switches S3, S4 and S5 may be closed as shown in FIG. 4B (block 320). In this mode power from battery 115 is attenuated twice before it may be used by smart device 205—once by boost regulator 125 within power bank 105 (loosing approximately 17% of its initial power, see discussion above) and another time by boost/buck regulator 240—operating in buck mode—within smart device 205 (loosing another approximately 17% of its power). This situation highlights the fact that when using prior art power banks approximately 31% of the power supplied by battery 115 is lost due to voltage conversion operations alone.

Figure 4C:
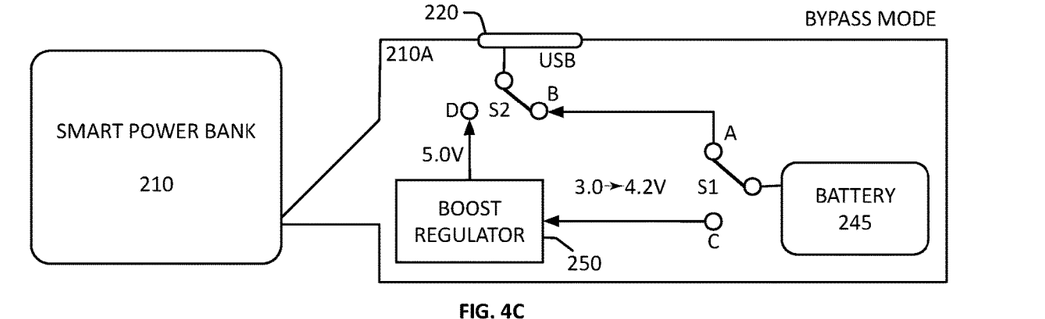
Figure 4D:
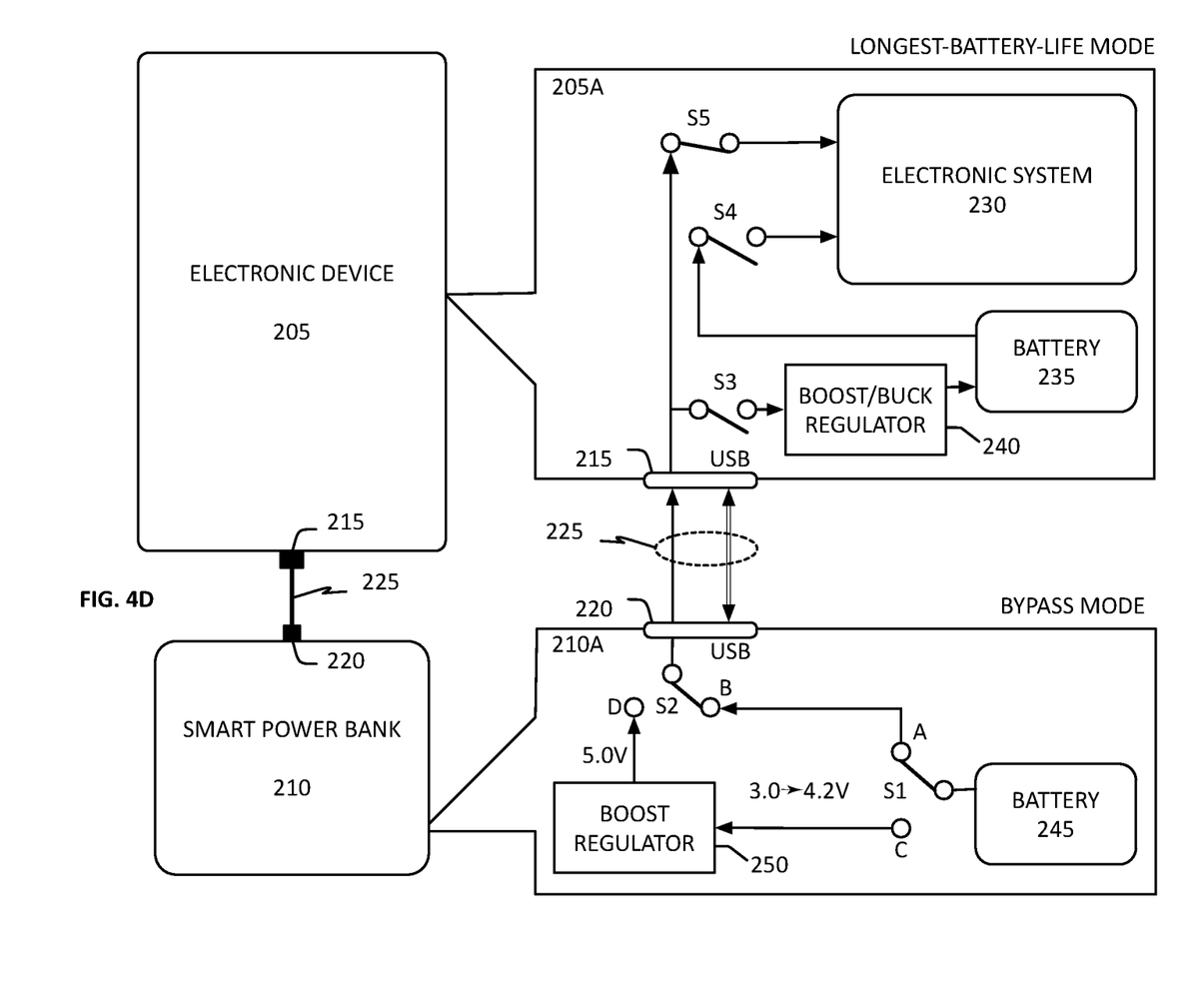

Returning to FIG. 3, if smart device 205 determines the connected power bank is a smart power bank and smart power bank 210 determines that electronic device 205 is capable of receiving battery voltage directly (the "YES" prong of block 315), smart power bank 210 may enter bypass mode by setting switch S1 to position A and switch S2 to position B as shown in FIG. 4C, another check may be made (Block 325). If charging is not selected (the "NO" prong of block 325), smart electronic device 205 may enter a "longest-battery-life" mode by opening switches S3 and S4 and closing switch S5 as shown in FIG. 4D (block 330). In this mode, power from battery 245 may be applied directly to smart device 205's electronic system 230— suffering no losses due to boost/buck operations. Stated differently, when smart power bank system 200 is operating in bypass: longest-battery-life mode in accordance with this disclosure, virtually 100% of smart power bank 210's battery 245's power may be used to operate electronic device 205 (so that smart device battery 235 maybe held in reserve as long as possible). In contrast, prior art power bank systems experience losses due to two voltage conversion operations (one in the power bank and another in the electronic device)—losing approximately 31% of the power supplied by a power bank's battery.

Figure 4E:
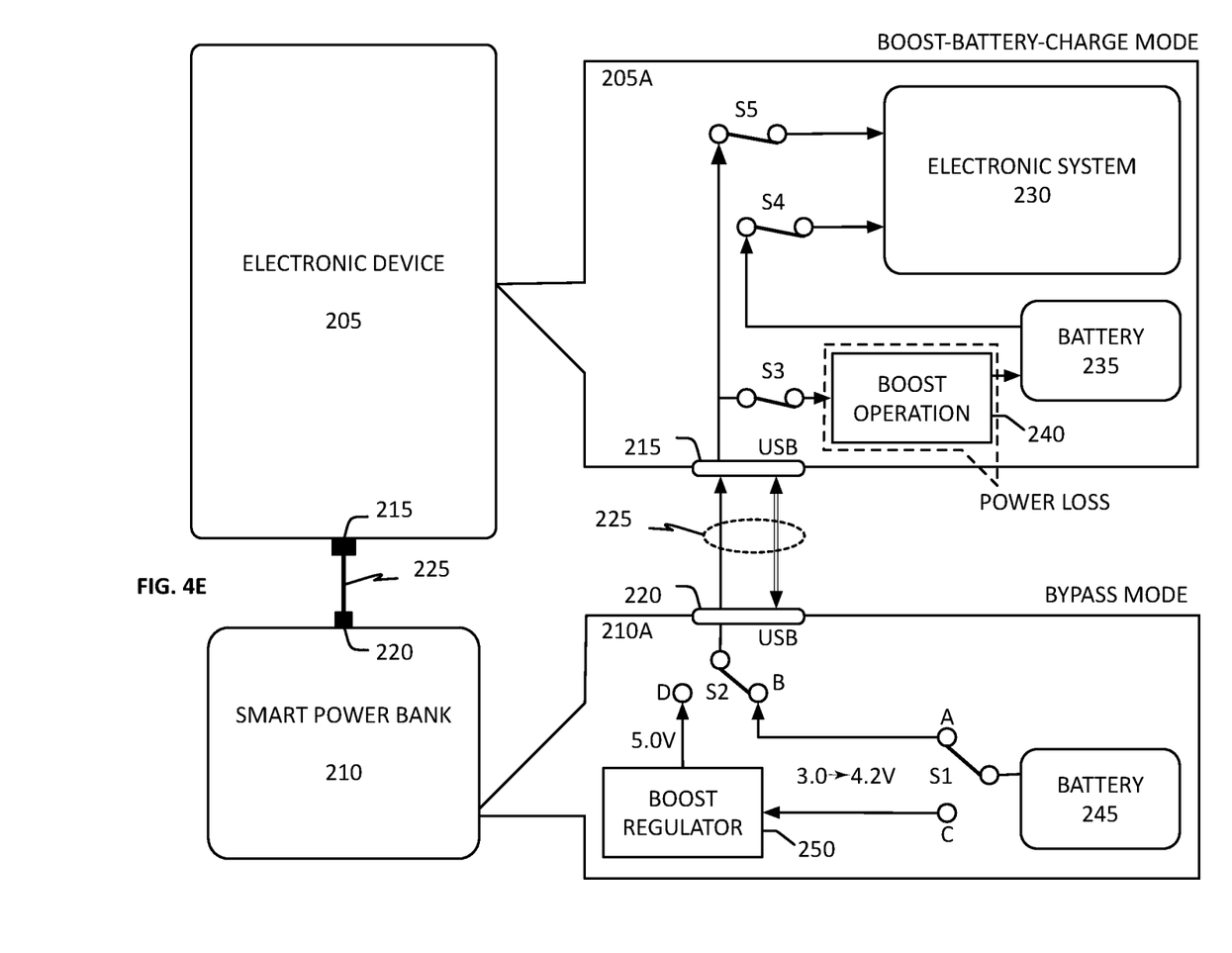

If, on the other hand, a user elects to use smart battery bank 210 to both power smart device 205 and charge its internal battery 235 (the "YES" prong of block 325), a further check may be made (block 335). If it is then determined that the power bank's battery voltage is not at least a specified value above the smart device's battery voltage (the "NO" prong of block 335), smart power bank 210 may enter bypass mode by setting switch S1 to position A, switch S2 to position B, and smart device 205 may enter a "boost-battery-charge" mode by closing switches S3, S4 and S5 and setting boost/buck regulator 240 to operate in a boost mode as shown in FIG. 4E (block 340). Setting boost/buck regulator 240 to boost mode allows it to adjust the voltage applied to battery 235 to optimize battery charge operations. In this configuration, the power supplied from smart power bank battery 245 directly to electronic system 230 suffers no loss (compared to approximately 31% in a prior art power bank system) while the power supplied from smart power bank battery 245 to charge smart device battery 235 will typically suffer only a single voltage-conversion loss of approximately 13% (leaving approximately 87% of the power to actually charge battery 235), half what a prior art power bank system experiences. It will be recognized that the value of the "specified" voltage (also known as a threshold or delta voltage) may depend at least on the type of batteries being used and may therefore vary from implementation to implementation.

Figure 4F:
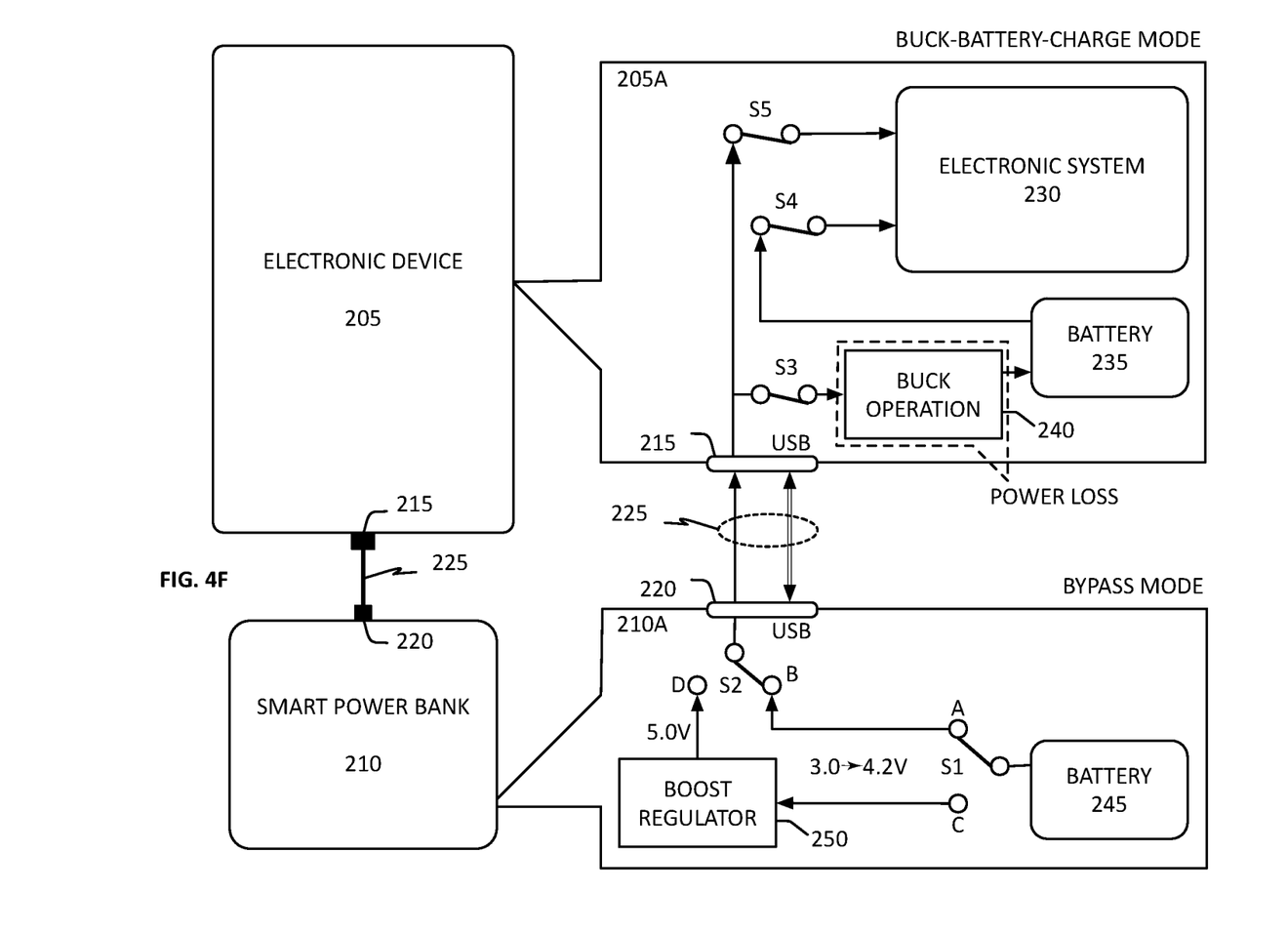

Returning again to FIG. 3, if it is determined that the power bank's battery voltage is at least the specified value above the smart device's battery voltage (the "YES" prong of block 335), smart power bank 210 may enter bypass mode by setting switch S1 to position A, switch S2 to position B (see FIG. 4C), and smart device 205 may enter a "buck-battery-charge" mode by closing switches S3, S4 and S5 and setting boost/buck regulator 240 to operate in a buck mode as shown in FIG. 4F (block 345). As determined in block 335, power bank battery 245 has sufficient voltage to charge electronic device battery 235 directly. Setting boost/buck regulator 240 to buck mode allows the voltage applied to battery 235 to be optimized for battery charge operations. In this configuration, the power supplied from smart power bank battery 245 directly to electronic system 230 suffers no loss (compared to approximately 31% loss in prior art power bank systems) while the power supplied from smart power bank battery 245 to charge smart device battery 235 will typically suffer a loss of approximately 13% (leaving approximately 87% of the power to actually charge battery 235)—only half that suffered by prior art power bank systems.

For devices like a smart phone (or other electronic device that draws a relatively large amount of current) it may be useful to close switch S4 when in any of the disclosed new and novel charging modes as illustrated in FIGS. 4D (longest-battery-life mode), 4E (boost-battery-charge mode), and 4F (buck-battery-charge mode). This may be because the device's internal battery 235 may provide a higher current that smart power bank's battery 245 so that, when initially coupled there could be current transient that smart power bank battery 245 is not quick enough to respond. This will generally not be necessary for small current consuming devices.

Figure 5:
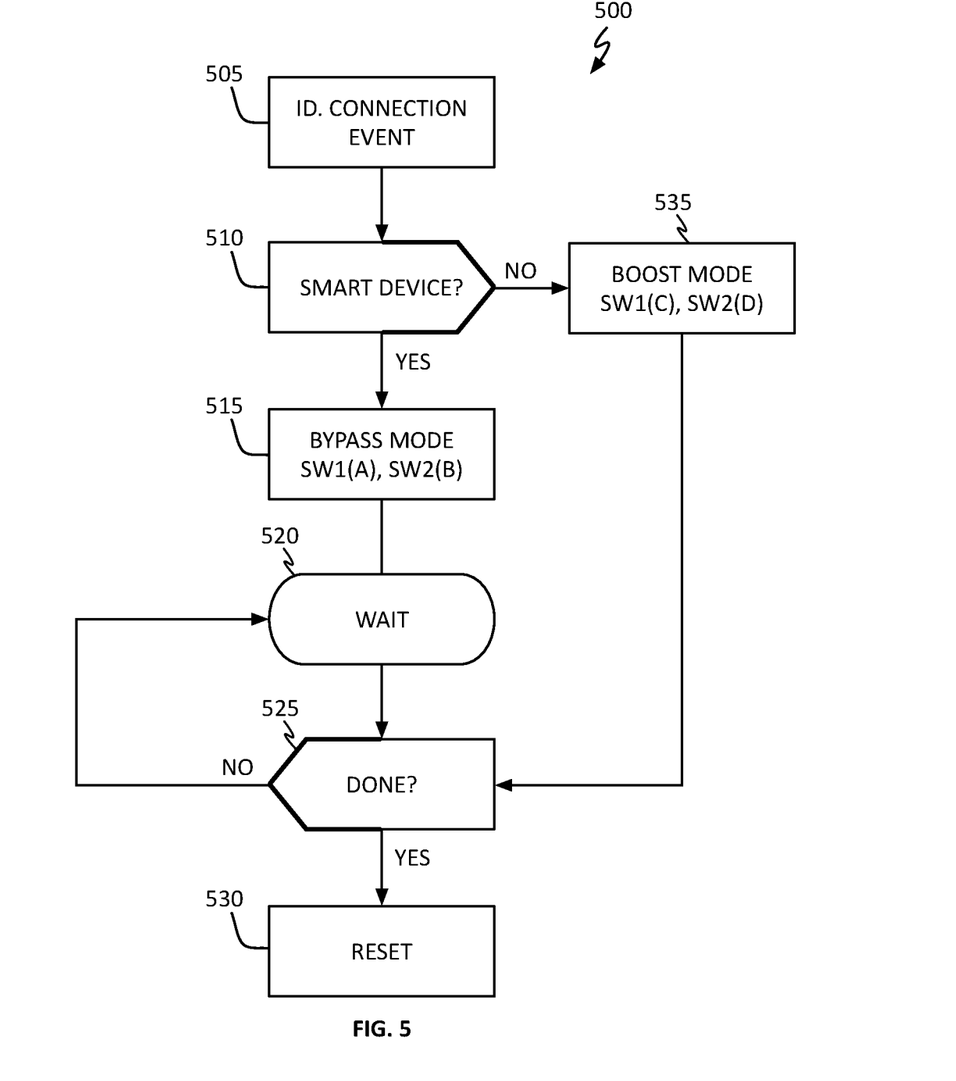
FIG. 5 shows, in flowchart form, smart battery bank centric power transfer operations in accordance with one embodiment.

Referring to FIG. 5, in one embodiment power transfer operation 500 from smart power bank 210's perspective may begin when a connection event is identified (block 505). A "connection event," as used here occurs when smart power bank 210 is connected to an electronic device (e.g., via connector 220). Once connected, smart power bank 210 may determine if the connected device is a smart device (block 510). As used herein, a "smart" device is any electronic device that is able to switch its internal routing of received power based on whether the device supplying that power can provide battery voltage directly (e.g., smart power bank 210). If the connected device is a smart device (the "YES" prong of block 510), the power bank 210 may put itself into bypass mode by setting switch S1 to position A and switch S2 to position B (see FIGS. 2 and 4C) (block 515). Smart power bank 210 may then wait for one of one or more termination conditions (block 520). A termination condition could be, for example, a loss of a signal from the connected device or an affirmative indication from the connected device that power transfer should stop. In one embodiment, smart power bank 210 may periodically check for the existence of a termination condition. In another embodiment, smart power bank 210 may continuously check for a termination condition. If a termination condition is found to exist (the "YES" prong of block 525), smart power bank 210 may reset itself and await the next event (block 530). If no termination condition is found (the "NO" prong of block 525), smart power bank 210 resumes waiting. Finally, returning to block 510, if the connected device is determined not to be a smart device (the "NO" prong of block 510), smart power bank 210 may put itself into "boost" mode by setting switch S1 to position C and switch S2 to position D (block 535), where after operations in accordance with block 525 are performed.

Figure 6A:
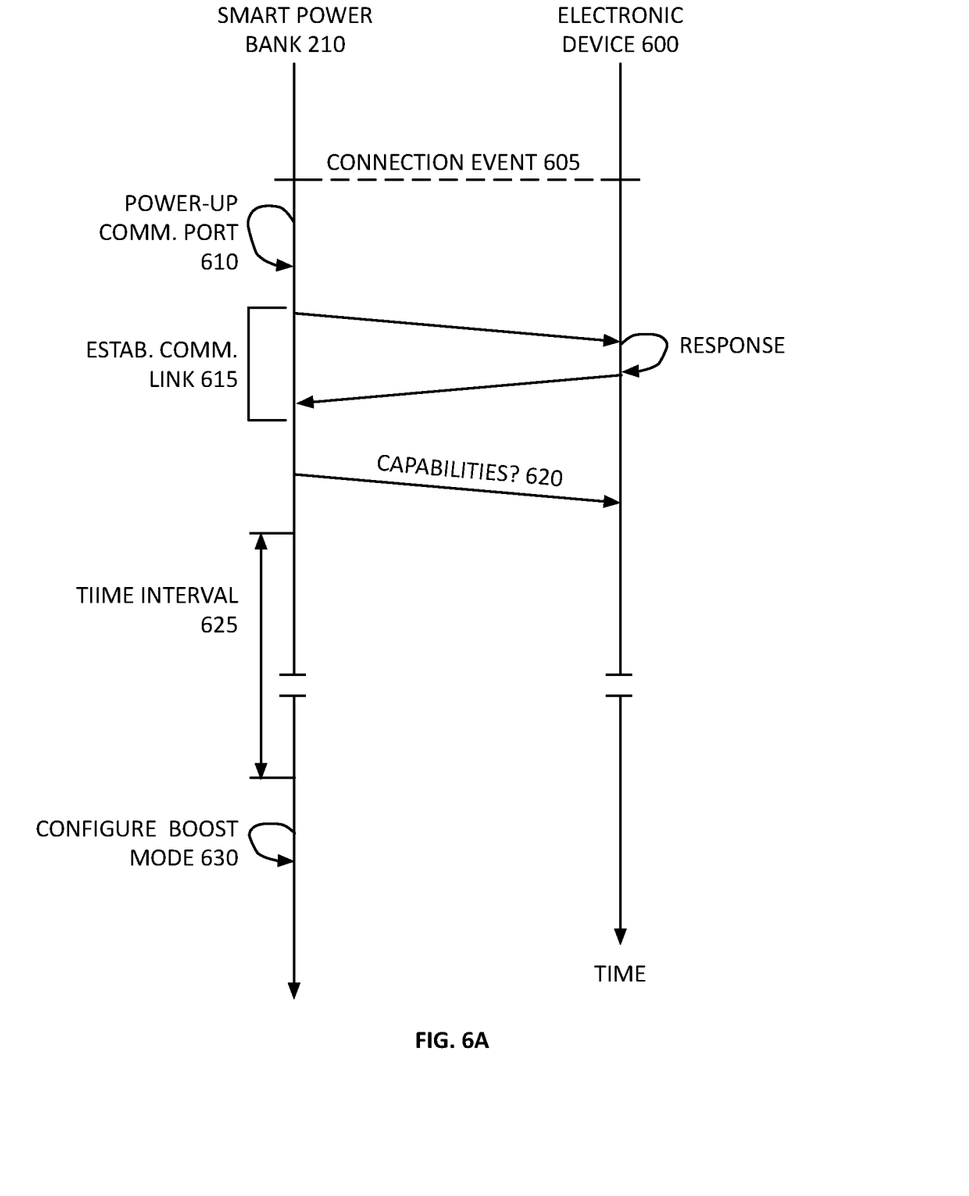
FIGS. 6A and 6B illustrate initial configuration operations in accordance with two embodiments.

A time sequence of actions that may occur during smart power bank system operations in accordance with this disclosure may be seen in FIG. 6. Referring first to FIG. 6A, when smart power bank 210 is initially connected to electronic device 600 (connection event 605), it begins operation by powering up the communication port 610 within connector 220 and establishing a communication's link 615 with electronic device 600 in accordance with connector 220/215's specified protocol (e.g., USB). Smart power bank 210 may then issue capabilities query 620 to determine if electronic device 600 is capable of receiving battery voltage directly through its connector 215. If, after specified time interval 625, smart power bank 210 has not received an indication that electronic device 600 can receive battery voltage directly through connector 215 (or, alternatively, receives an affirmative indication from electronic device 600 that it cannot do so), smart power bank 210 may configure itself for boost (conventional) operations 630 in which switch S1 is placed into position C and switch S2 is placed into position D (see FIG. 2).

Figure 6B:
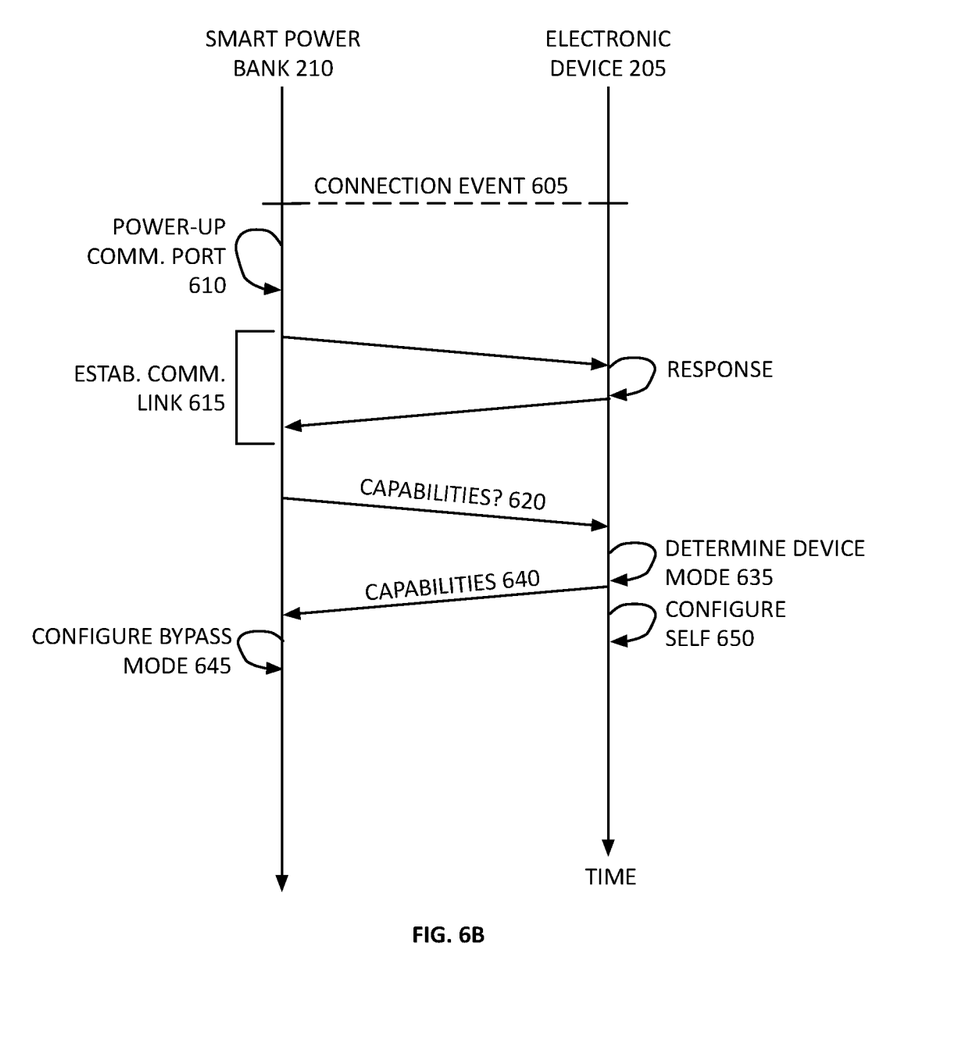

Referring now to FIG. 6B, when smart power bank 210 is initially connected to smart electronic device 205 (connection event 605), actions in accordance with FIG. 6A repeat until smart power bank 210 issues capabilities request 620. Electronic device 205 may then respond indicating that it is capable of receiving battery voltage directly 635. In response, smart power bank 210 configures itself into bypass mode 640 in which switch S1 is placed into position A and switch S2 is placed into position B (see FIG. 2). In one embodiment electronic device 205 may then determine a user's desired operating mode 645 (e.g., longest-battery-life (see FIG. 4D), boost-battery-charge (see FIG. 4E) or buck-battery-charge (FIG. 4F) mode) and, once known, configures itself to that mode 650. In another embodiment, if only the longest-battery-life mode is provided as illustrated in FIGS. 3 and 4C, operation 645 may be eliminated.

Figure 7A:
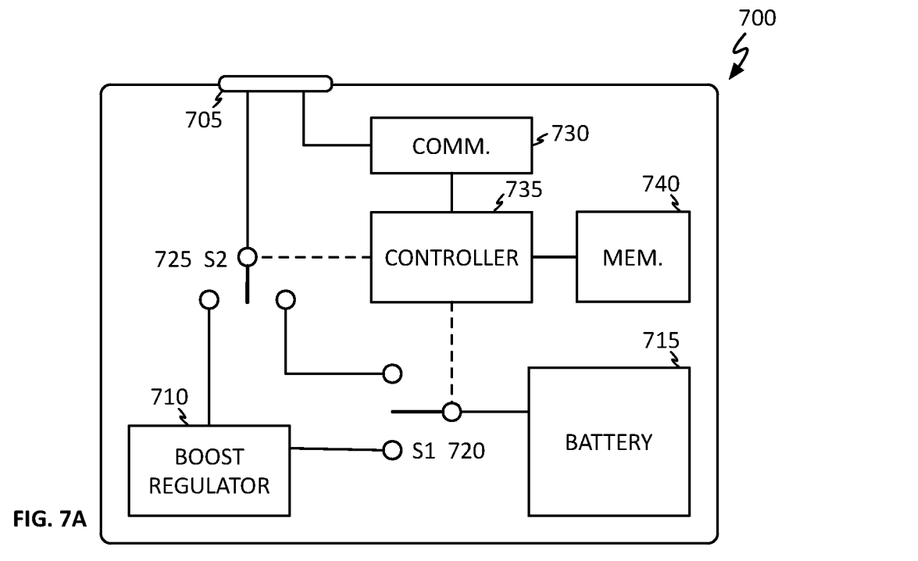
FIGS. 7A and 7B illustrate, in block diagram form, a smart power bank in accordance with various embodiments.

Referring to FIG. 7A, smart power bank 700 in accordance with one embodiment may include external connector 705, boost regulator 710, battery 715, switch S1 720, switch S2 725, communications module 730, controller 735 and memory 740. Connector 705 may be any connector whose physical arrangement and function has been agreed upon. Within this disclosure, connector 705 has been described in terms of a USB connector. This should not be understood as limiting. By way of example only, connector 705 could also be a Firewire connector (IEEE 1394 Standard) or a DisplayPort connector (a Video Electronics Standards Association Standard). (FIREWIRE® is a registered trademark of Apple Inc.) Boost regulator 710 may be any circuit or module designed to increase the DC voltage level of an input DC voltage signal. Battery 715 may be any type of battery (e.g., lithium-ion, lead-acid and nickel-cadmium batteries). Switches S1 720 and S2 725 may be any type of switches and may vary from implementation to implementation depending inter alia on the voltage and power levels being switched. (Together, switches S1 and S2 may be referred to as a switching mechanism, circuit or module.) Communication circuit or module 730 may be any type of circuit needed to coordinate communication through connector 705 in the manner described herein. For example, communication module 730 may orchestrate communication through connector 705 in accordance with the USB standard. Controller 735 may be any circuit, module or unit capable of controlling the actions within smart power bank 700. For example, controller 735 may be a microcontroller implemented as a single chip or as a series of chips (e.g., a commercial microprocessor or a custom designed state machine implemented via, for example, programmable gate-array technology). In some embodiments, the functions attributed to communication module 730 may be performed by controller 735. Memory 740 may be used to store operating parameters and program code that when executed by controller 735 causes controller 735 to perform the control functions discussed herein. Memory 740 could include volatile and non-volatile memory.

Figure 7B:
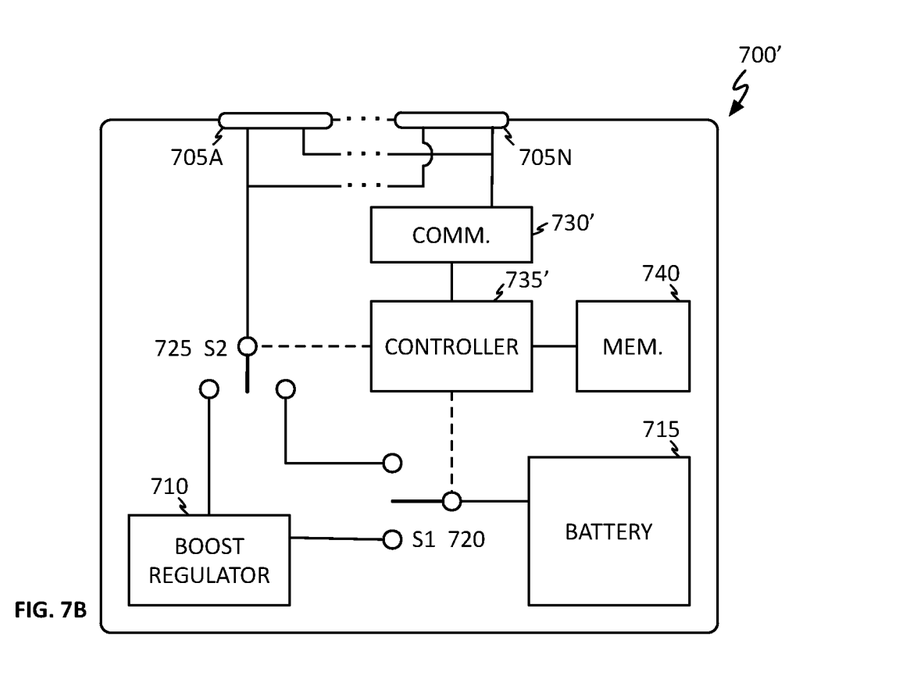

Referring to FIG. 7B, in another embodiment smart power bank 700' may include a number of connectors 705A-705N, each one of which could serve the function of connector 705. In an implementation such as this, it would be the task of communication module 730' (and/or controller 735') to identify the connector being used and to use the corresponding communication protocol. In yet another embodiment, connector 705 could be a "generic" connector which is capable of accepting a number of different standard connectors. In an implementation such as this, it would be the function of communication module 730 and/or controller 735 to identify the communication standard required by the connected electronic device.

Figure 8:
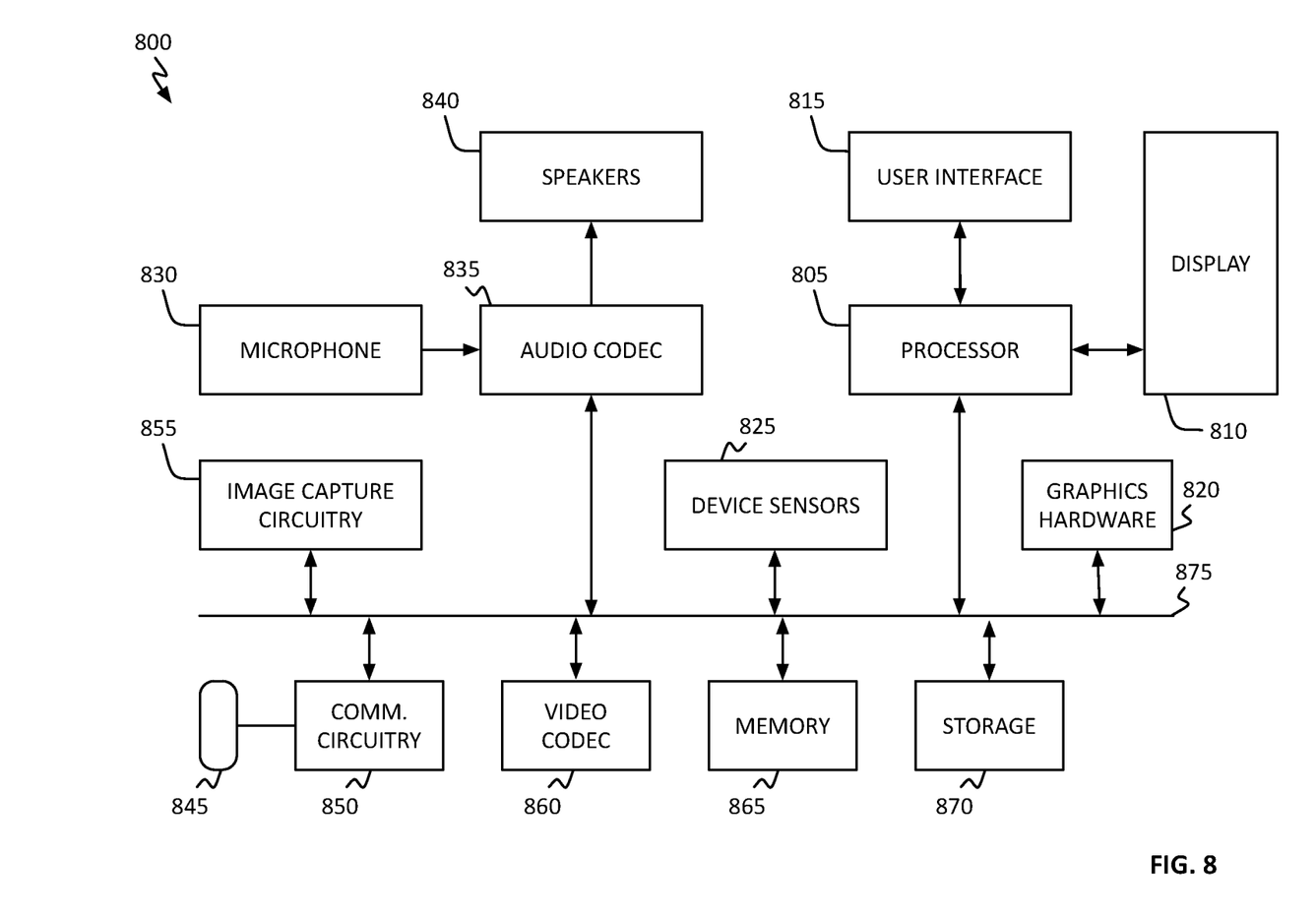
FIG. 8 shows, in block diagram form, an electronic device in accordance with one embodiment.

Referring to FIG. 8, a simplified functional block diagram of illustrative electronic device 800 (e.g., 205) is shown according to one embodiment. Electronic device 800 could be, for example, a mobile telephone, personal media device, portable camera, or a tablet, notebook or desktop computer system. As shown, electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, external connector 845, communications circuitry 850, image capture circuit or unit 855, video codec(s) 860, memory 865, storage 870, and communications bus 875.

Processor 805 may execute instructions necessary to carry out or control the operation of many functions performed by device 800 (e.g., such as control of switches within the electronic device to effect a chosen operating mode). Processor 805 may, for instance, drive display 810 and receive user input from user interface 815. User interface 815 can take a variety of forms, such as a button, keypad, dial, a click wheel, keyboard, display screen and/or a touch screen. User interface 815 could, for example, be the conduit through which a user may indicate a chosen operating mode (i.e., longest-battery-life, boost-battery-charge or buck-battery-charge mode). Processor 805 may be a system-on-chip such as those found in mobile devices and include one or more dedicated graphics processing units (GPUs). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 perform computational tasks. In one embodiment, graphics hardware 820 may include one or more programmable graphics processing units (GPUs).

External connector 845 may be any type of connector that has an agreed-upon structure and communication protocol (e.g., USB, FireWire and DisplayPort connectors). Connector 845 may correspond to connector 215 in any of FIGS. 2, 4C-4F, and 7A-7B. Communication circuit or module 850 may control the flow of signals (power and/or information) through connector 845 in accordance with, for example, FIGS. 6A-6B.

Image capture circuitry 855 may capture still and video images that may be processed to generate images. Output from image capture circuitry 855 may be processed, at least in part, by video codec(s) 860 and/or processor 805 and/or graphics hardware 820, and/or a dedicated image processing unit incorporated within circuitry 855. Images so captured may be stored in memory 865 and/or storage 870. Memory 865 may include one or more different types of media used by processor 805, graphics hardware 820, and image capture circuitry 855 to perform device functions. For example, memory 865 may include memory cache, read-only memory (ROM), and/or random access memory (RAM). Storage 870 may store media (e.g., audio, image and video files), computer program instructions or software, preference information, device profile information, and any other suitable data. Storage 870 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 865 and storage 870 may be used to retain computer program instructions or code organized into one or more modules and written in any desired computer programming language. When executed by, for example, processor 805 such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, FIGS. 3 and 5 show flowcharts illustrating functions of both an electronic device and smart power bank in accordance with the disclosed embodiments. In one or more embodiments, one or more of the disclosed steps may be omitted, repeated, and/or performed in a different order than that described herein. Accordingly, the specific arrangement of steps or actions shown in any figure should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A smart battery bank, comprising:
   a battery;
   a voltage level converter configured to convert a first voltage to a second voltage, wherein the second voltage is higher than the first voltage;
   one or more switches;
   a connector; and
   a controller operatively coupled to the one or more switches and the connector, the controller configured to execute instructions stored in a memory, the instructions adapted to cause the controller to—
      obtain a signal from the connector,
      configure the one or more switches to route output from the battery to the connector without use of the voltage level converter when the signal indicates that an electronic device of a first type is coupled to the connector, and
      configure the one or more switches to route output from the battery to an input of the voltage level converter and output from the voltage level converter to the connector when the signal indicates that an electronic device of a second type is coupled to the connector.

2. The smart battery bank of claim 1, wherein the voltage level converter is adapted to output a voltage corresponding to a type of the connector.

3. The smart battery bank of claim 2, wherein the voltage level converter is adapted to output a nominal voltage of 5.0 volts when the connector comprises a USB connector.

4. The smart battery bank of claim 1, wherein the voltage level converter is adapted to convert an input voltage of between 3.0 volts and 4.2 volts to an output voltage of nominally 5.0 volts.

5. The smart battery bank of claim 1, wherein the first type of electronic device comprises an electronic device that is capable of alternatively accepting, through a device connector adapted to mate with the connector:
   output from the battery at a specified portion of the device connector; and
   output from the voltage level converter's output at the specified portion of the device connector.

6. A method to efficiently transfer power from a power bank to an electronic device, comprising:
   obtaining, at an output connector of a portable power bank, a signal indicative of a type of electronic device coupled to the portable power bank through the output connector;
   configuring a one or more switches of the portable power bank to route output from a battery of the portable power bank directly to a specified portion of the output connector in response to the signal indicating a first type of electronic device is connected thereto, so that power is transferred from the portable power bank to the electronic device without losses attributable to voltage step-up operations of a voltage level converter; and
   configuring the one or more switches to route output from the battery to an input of the voltage level converter and the resulting output from the voltage level converter to the specified portion of the output connector in response to the signal indicating a second type of electronic device is connected thereto.

7. The method of claim 6, wherein the voltage level converter is adapted to output a voltage corresponding to a type of the output connector.

8. The method of claim 7, wherein the voltage level converter is adapted to output a nominal 5.0 volts when the output connector comprises a USB connector.

9. The method of claim 6, wherein the voltage level converter is adapted to convert an input voltage of between 3.0 volts and 4.2 volts to a nominal output voltage of 5.0 volts.

* * * * *

UNITED STATES PATENT AND TRADEMARK OFFICE
CERTIFICATE OF CORRECTION

PATENT NO. : 10,797,358 B2
APPLICATION NO. : 15/955206
DATED : October 6, 2020
INVENTOR(S) : XunGuang Xu et al.

Page 1 of 1

It is certified that error appears in the above-identified patent and that said Letters Patent is hereby corrected as shown below:

In the Claims

Claim 6, at Column 10, Line 18, delete "a" after -- configuring --

Signed and Sealed this
Twelfth Day of January, 2021

Andrei Iancu
*Director of the United States Patent and Trademark Office*